Patented May 11, 1937

2,080,071

UNITED STATES PATENT OFFICE 2,080,071

TRI-SUBSTITUTED BARBITURIC ACID

Friedrich Boedecker, Dahlem, near Berlin, and Heinrich Gruber, Schoneberg, near Berlin, Germany, assignors to the firm J. D. Riedel-E. de Haen A.-G., Berlin, Germany No Drawing. Application July 27, 1933, Serial No. 682,528. In Germany July 4, 1932

13 Claims. (Cl. 260—33)

The present invention relates to a process of producing carbon-substituted and nitrogen-substituted barbituric acids.

We have now found a new class of barbituric acids which are exceedingly well suited for therapeutical purposes. These barbituric acids are acids of the formula:

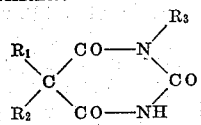

in which at least one of the substituents $R_1$, $R_2$, $R_3$ represents an allyl group which is halogenated on the double binding, suitably at least in the $\beta$-position, and in which the other two radicals, which do not need to be like each other, either correspond to the first radical or are other aliphatic or hydroaromatic groups.

$R_1$ may for instance represent the said allyl group, whereas $R_2$ and $R_3$ denote the same or different aliphatic radicals, for instance also the said halogen allyl group or a hydroaromatic radical. The compounds may for instance also be composed in such a manner, that $R_3$ represents a radical which is monohalogenated on the binding, whereas $R_1$ and $R_2$ may be aliphatic or hydroaromatic radicals of any possible kind.

The novel compounds are produced in a manner known per se, for instance by converting monosubstituted malonic acids, or the esters, chlorides or similar derivatives of these acids, or the corresponding derivatives of the cyan acetic acid with N-substituted ureas or their derivatives, such as guanidines, thio ureas, acetyl ureas and the like, into the corresponding barbituric acids and introducing the still missing radical into the obtained barbituric acids. It is also possible, when starting with disubstituted malonic acids or similar compounds or derivatives of same, to produce trisubstituted barbituric acids directly. Moreover, it is also possible during the first stage of treatment to produce barbituric acids which contain only one or two of the substituents and to introduce the still missing substituents into the acids subsequently. If it for instance is desired to introduce a halogen allyl radical, this may be performed in a very simple manner by treating the CC-disubstituted barbituric acids, in the form of aqueous solutions of their alkali salts, with 1,2-dihalogen-2,3-propen. The reaction will take place surprisingly readily, for instance already at temperatures of about 50° C. When working at higher temperatures, whereby the duration of the reaction is shortened to a remarkable degree, also excellent yields are obtained. This is a very surprising fact, since disubstituted barbituric acids are very sensitive towards aqueous alkalis.

Several of the said nitrogen substituted barbituric acids are obtained in the form of oils or viscous masses and substances of such consistency are of course not suited for practical use. The acids are dissolved in the usual organic solvents and when the solvents have been removed a viscous, sticky mass is left. It has, however, now been found, that it in the most cases is possible to obtain crystallized, pure products by treating with aqueous acetic acid. This is a very surprising fact, since the crystallization ability of such substances usually is reduced still more when water is added to solutions of the same in organic solvents.

The novel acids are particularly important for therapeutic purposes. When given intravenous the patient will already during the injection fall into a deep sleep of which he will wake up at full consciousness after a short time. The said acids are therefore exceedingly well suited for use in the ambulant practice, in clinics and during the consultation hours of physicians. An injection will cause a short compulsory sleep with total unconsciousness and retrograde amnesia and the patient will wake up at full consciousness. Another important advantage of the compounds here described is, that the aqueous solutions of their alkali salts are relatively very stable. Solutions of the alkali salts of other trisubstituted alkali salts show sediments when stored for a short time in closed ampules, even when a stabilizer has been added. In contrast hereto solutions of salts of the acids here described will remain stable for several months, particularly if a stabilizer, such as for instance phenyl dimethyl pyrazolone has been added. This is apparently due to the fact, that the hydrogen exponent of these solutions is very advantageously located.

The said advantages become particularly prominent at the trisubstituted barbituric acids having in total 9–12 C-atoms and above all at acids of this kind which on the carbon, besides a saturated aliphatic radical, have a halogen allyl group and on the nitrogen has either a halogen allyl group or a methyl or ethyl group. The most valuable among the barbituric acids with a halogen allyl radical are again the acids which have chlorine in the $\beta$-position.

*Example 1*

269 parts by weight of isopropyl malonic acid ester are together with an alcoholate solution prepared from 92 parts by weight of sodium and 950 parts by volume of ethyl alcohol and 133 parts by weight of N-methyl urea are boiled for several hours and condensed under reflux. The C-isopropyl-N-methyl barbituric acid, which is separated in conventional manner, melts at 101–102° C. Yield: 210 parts by weight.

202,4 parts by weight of this acid are dissolved in 495 parts by volume of 2N—NaOH and together with 242 parts by weight of 2,3-dibrompropen-(1) stirred vigorously for 5 hours in a boiling water bath under reflux. The reaction product, which solidifies on being cooled, consists of C,C-isopropyl-β-bromallyl-N-methyl barbituric acid and has after re-precipitation and recrystallization from aqueous alcohol a melting point of 115° C. Yield: 224 parts by weight.

Example 2

46 g. of sec. amyl malonic acid ester are by means of an alcoholate solution prepared from 13,8 g. of sodium and 150 cm.³ of ethyl alcohol condensed together with 22,2 g. of N-methyl-urea by being heated to 105–110° C. for several hours on a reflux cooler. The reaction product, which is obtained in the form of a paste, is dissolved in water and the obtained solution is cleared with coal and then super-saturated with hydrochloric acid, whereupon the alcohol is driven out by distillation at reduced pressure. After a re-precipitation the barbituric acid is obtained in the form of an oily liquid. The acid is separated from the precipitation fluid and dissolved in ether, whereupon the etheric solution is washed with water and dried over calcium chloride. When the ether has evaporated the sec. amyl-N-methyl barbituric acid is obtained in the form of a clear substantially colorless oil. When dissolved in soda a clear solution is obtained. The product has an acid number of 209,8 (calculated to 212,1). Yield: 32 g.

29,7 g. of the oil are dissolved in 70 cm.³ of 2N-soda lye and together with 30,8 g. of 2,3-dibrom-propen-(1) heated to 90° C. for 10 hours under vigorous stirring. The oily reaction product is dissolved in soda lye and the alkaline solution is separated from the surplus of dibrompropen and acidified cautiously. The barbituric acid, which is obtained is in the form of an oil redissolved from ether. A powderizable product can however only be obtained by crystallization from acetic acid of high percentage. If water is added to the hot solution in glacial acetic acid until the solution begins to grow turbid the β-bromallyl-sec-amyl-N-methyl barbituric acid is obtained in the form of colorless needles which are grouped in tufts and have a melting point of 98–100° C. Yield: 29 g.

The acid dissolves readily in alkalis, ether, acetone, alcohol, glacial acetic acid and benzol, but very difficultly in water.

Example 3

A solution of 195 parts by weight of sec. butyl-bromallyl-barbituric acid sodium in 1800 parts of water are heated together with 132 parts by weight of 1,2-dibrompropen-(-2,3) to 90° C. for 10 hours under vigorous stirring and under reflux. The oily reaction product which separates out is dissolved in soda lye, freed from the surplus of dibrompropen and precipitated by means of diluted acetic acid. By redissolving from acetic acid of 50% the CC-sec. butyl-bromallyl-N-bromallyl-barbituric acid is obtained in the form of colorless crystals having a melting point of 92–93° C. Yield: 230 parts by weight.

The acid dissolves in alcohol and glacial acetic acid already in the cold and dissolves easily in chloroform at raised temperature. The acid dissolves however only with difficulty in petrol ether and is almost insoluble in water.

Example 4

To a mixture of 867 parts by weight of isopropyl-bromallyl barbituric acid in 3000 parts by volume of N soda lye 612 parts by volume of 2,3-dibrompropen-(-1) are added and the mixture is stirred for 12 hours at 85° C. by dissolving in soda lye, treating with coal, precipitating with acetic acid and finally by crystallization from diluted acetic acid the product is obtained in the form of coarse needles having a melting point of 120–121° C. in a yield of 80%.

The CC-isopropyl-bromallyl-N-bromallyl barbituric acid dissolves readily in alcohol, ether and glacial acetic acid, but heavily in petrol ether and only very heavily in water.

Example 5

368 parts by weight of diethyl barbituric acid, dissolved in 1000 parts by volume of 2N-soda lye are stirred together with 420 parts by weight of 2,3-dibromo-1,2-propene at 50° C. until the aqueous reaction solution has been tested with hydrochloric acid and this test has shown, that the solution no longer contains any matter which is insoluble in water. The oily reaction product which is separated out is separated from the surplus of dibrompropen by reprecipitation. When cooling thoroughly the end product precipitates from aqueous alcohol in the form of colorless crystals having a melting point of 101–102° C. Yield: 68%.

The CC-diethyl-N-bromallyl barbituric acid dissolves very readily in alcohol, acetone, ether, benzol and glacial acetic acid already in the cold, but dissolves difficultly in petrol ether and water.

Example 6

A solution of 448 parts by weight of sec. butylallyl barbituric acid in 2000 parts by volume of N soda lye and 408 parts by weight of 2,3-dibromo-1,2-propene are heated to 75° C. for 10 hours under vigorous stirring and under reflux. The oily product obtained is separated from the reaction lye, dissolved in 1000 parts by volume of N soda lye under stirring and addition of coal and precipitated under cooling (with ice) by conducting carbon dioxide through the solution. The obtained oil is dissolved in ether, dried over $CaCl_2$ and, when the ether has been evaporated, distilled under reduced pressure. The C,C-sec. butylallyl-N-bromallyl-barbituric acid passes over as a colorless oil at 188–190° C. and a pressure of 2 mm. The oil will gradually solidify when left to itself. The crystallization may be accelerated by triturating with water. The end product has a melting point of 62–65° C. Yield: 78%.

The acid dissolves very readily in alcohol, ether, acetone and glacial acetic acid, but can only with difficulty be dissolved in water.

Example 7

A solution of 311 parts by weight of isopropyl-bromallyl barbituric acid sodium in 1000 parts by volume of water is stirred vigorously for several hours at 90° C. and under reflux cooling together with 116 parts by weight of 2,3-dichloro-1,2-propene under addition of 0,1 part by weight of sodium iodide. The oily reaction product is thereupon treated as described in Example 1.

The C,C - isopropyl - bromallyl - N - chlor-allyl barbituric acid is obtained in the form of colorless needles. This acid melts at 108–109° C. Yield: 82%.

The acid dissolves readily in alcohol, glacial acetic acid and benzol and dissolves somewhat lesser readily in ether. In petrol ether and water the acid dissolves only with great difficulty.

*Example 8*

138 parts by weight of sodium are dissolved in 1500 parts by volume of absolute alcohol, whereupon 404 parts by weight of isopropyl malonic ester and 260 parts by weight of methyl-acetyl-urea are added. The mixture is boiled on a reflux cooler for 4 hours. At the subsequent condensation the acetyl radical is split off and the C-isopropyl-N-methyl barbituric acid mentioned in Example 1 is obtained directly.

184 parts by weight of this acid are dissolved in 1000 parts by volume of N soda and are together with 163 parts by volume of 2-chlorine-3-brom-propen (-1) heated for 6 hours to 85° C. under stirring and reflux. The reaction product, which is separated out in solid state, is re-precipitated and is hereby freed from the surplus of chlor-brom-propen employed. Finally the product is recrystallized from diluted alcohol. The C,C-isopropyl - β - chlorine-allyl-N-methyl barbituric acid is obtained in the form of colorless needles and has a melting point of 117–118° C.

The same acid may be obtained by dissolving 80 parts by weight of C,C-chlorine-allyl-isopropyl barbituric acid in 328 parts by volume of N-soda lye, treating this solution for some hours in the cold and under stirring with 45 parts by weight of dimethyl sulphate and thereupon subjecting this mixture to the known final treatment.

In analogous manner the following products were produced:

C,C-sec. amyl-bromallyl-N-bromallyl barbituric acid. Melting point: 83–85° C. (From aqueous acetic acid.) Yield: 82%.

C,C-cyclohexyl - allyl - N - bromallyl barbituric acid. Boiling point₂: 205–210° C. Melting point: 80–82° C. (From aqueous acetic acid.) Yield: 74%.

C,C - isopropyl - allyl - N - bromallyl barbituric acid. Boiling point₂: 174–178° C. Melting point: 62–65° C. Yield: 83%.

C,C-n-butyl-allyl-N-bromallyl barbituric acid. Boiling point₁: 178–182° C. This acid melts below 50° C. Yield: 75%.

Sec. butyl-bromallyl-N-chlor-allyl barbituric acid. Boiling point₂: 212–215° C. This acid solidifies to a crystalline substance when left to itself. Melting point: 66–68° C. Yield: 78%.

The acids dissolve readily in most the organic solvents but dissolved only with difficulty in petrol ether.

We claim:

1. As a product of manufacture, trisubstituted barbituric acids of the formula

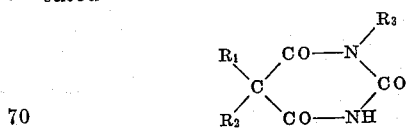

in which one of the three radicals R₁, R₂, R₃ represents β-mono-halogen-allyl, whereas both the other radicals denote any aliphatic group containing a maximum of six carbon atoms.

2. As a product of manufacture, trisubstituted barbituric acids of the formula

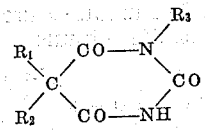

in which one of the three radicals R₁, R₂, R₃ represents mono-bromine-allyl, whereas both the other radicals denote any aliphatic group containing a maximum of six carbon atoms.

3. As a product of manufacture, trisubstituted barbituric acids of the formula

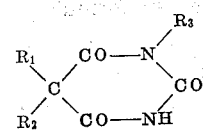

in which R₁ represents β-mono-halogen-allyl, whereas R₂ and R₃ denote an aliphatic group containing a maximum of six carbon atoms.

4. As a product of manufacture, trisubstituted barbituric acids of the formula

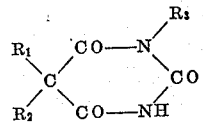

in which R₁ represents β-mono-halogen-allyl and R₂ denotes any aliphatic radical containing a maximum of six carbon atoms, whereas R₃ represents an aliphatic group containing less than three carbon atoms.

5. As a product of manufacture, trisubstituted barbituric acids of the formula

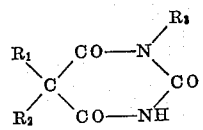

in which R₁ represents β-mono-halogen-allyl and R₂ denotes any aliphatic radical containing a maximum of six carbon atoms, whereas R₃ represents β-mono-halogen-allyl.

6. As a product of manufacture, trisubstituted barbituric acids of the formula

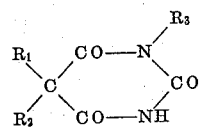

in which R₁ represents β-mono-bromine-allyl and R₂ and R₃ represent any aliphatic radical containing a maximum of six carbon atoms.

7. As a product of manufacture, trisubstituted barbituric acids of the formula

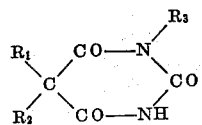

in which R₁ represents β-mono-bromine-allyl and R₂ denotes any aliphatic radical containing a maximum of six carbon atoms, whereas R₃ represents an aliphatic radical with less than three carbon atoms.

8. As a product of manufacture, trisubstituted barbituric acids of the formula

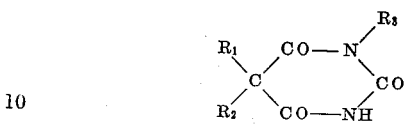

in which R₁ represents β-mono-bromine-allyl and R₂ renotes any aliphatic radical containing a maximum of six carbon atoms, whereas R₃ represents β-mono-halogen allyl.

9. As a product of manufacture, trisubstituted barbituric acids of the formula

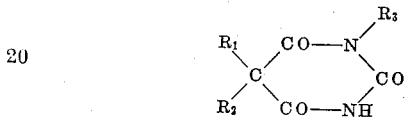

in which R₁ and R₂ represent any aliphatic radical containing a maximum of six carbon atoms and R₃ denotes β-mono-halogen allyl.

10. As a product of manufacture, trisubstituted barbituric acids of the formula

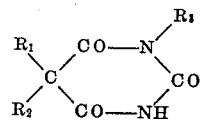

in which R₁ and R₂ represent any aliphatic radical containing a maximum of six carbon atoms and R₃ denotes β-mono-bromine allyl.

11. As a product of manufacture, C,C-isopropyl-β-bromine-allyl-N-methyl barbituric acid having a melting point of about 115° C.

12. As a product of manufacture, C,C-isopropyl-β-bromine-allyl-N-bromine-allyl barbituric acid consisting of coarse needles having a melting point of about 120–121° C. and dissolving readily in alcohol, ether and glacial acetic acid, less readily in petrol ether and still less readily in water.

13. As a product of manufacture, C,C-isopropyl-β-chlorine-allyl-N-methyl barbituric acid having a melting point of about 117–118° C.

FRIEDRICH BOEDECKER.
HEINRICH GRUBER.